United States Patent [19]

Black

[11] Patent Number: 4,941,894

[45] Date of Patent: Jul. 17, 1990

[54] GAS DRYING OR FRACTIONING APPARATUS AND METHOD

[75] Inventor: James B. Black, Elizabeth, Pa.

[73] Assignee: Hankison Division of Hansen, Inc., Canonsburg, Pa.

[21] Appl. No.: 180,300

[22] Filed: Apr. 12, 1988

[51] Int. Cl.⁵ .................................... B01D 53/04
[52] U.S. Cl. ............................ 55/20; 55/33; 55/163
[58] Field of Search ............... 55/20, 33, 62, 162, 55/163

[56] References Cited

U.S. PATENT DOCUMENTS

| | | | |
|---|---|---|---|
| 3,395,510 | 8/1968 | Barnes | 55/20 |
| 4,197,075 | 4/1980 | White et al. | 55/20 |
| 4,247,311 | 1/1981 | Seibert et al. | 55/162 |
| 4,504,286 | 3/1985 | Carlisle et al. | 55/20 |
| 4,552,570 | 11/1985 | Gravatt | 55/20 |

Primary Examiner—Charles Hart
Attorney, Agent, or Firm—Carothers & Carothers

[57] ABSTRACT

A novel pressure swing type desiccant dryer for separating a gas fraction such as water vapor from a gas mixture, and a novel demand control system and method for controlling the operating cycle of such a dryer by variation of the time duration of a drying or a regeneration cycle portion in a manner to satisfy prescribed conditions of energy transfer, as indicated preferably by temperature variations which occur over time in the drying and regeneration cycle portions.

32 Claims, 1 Drawing Sheet

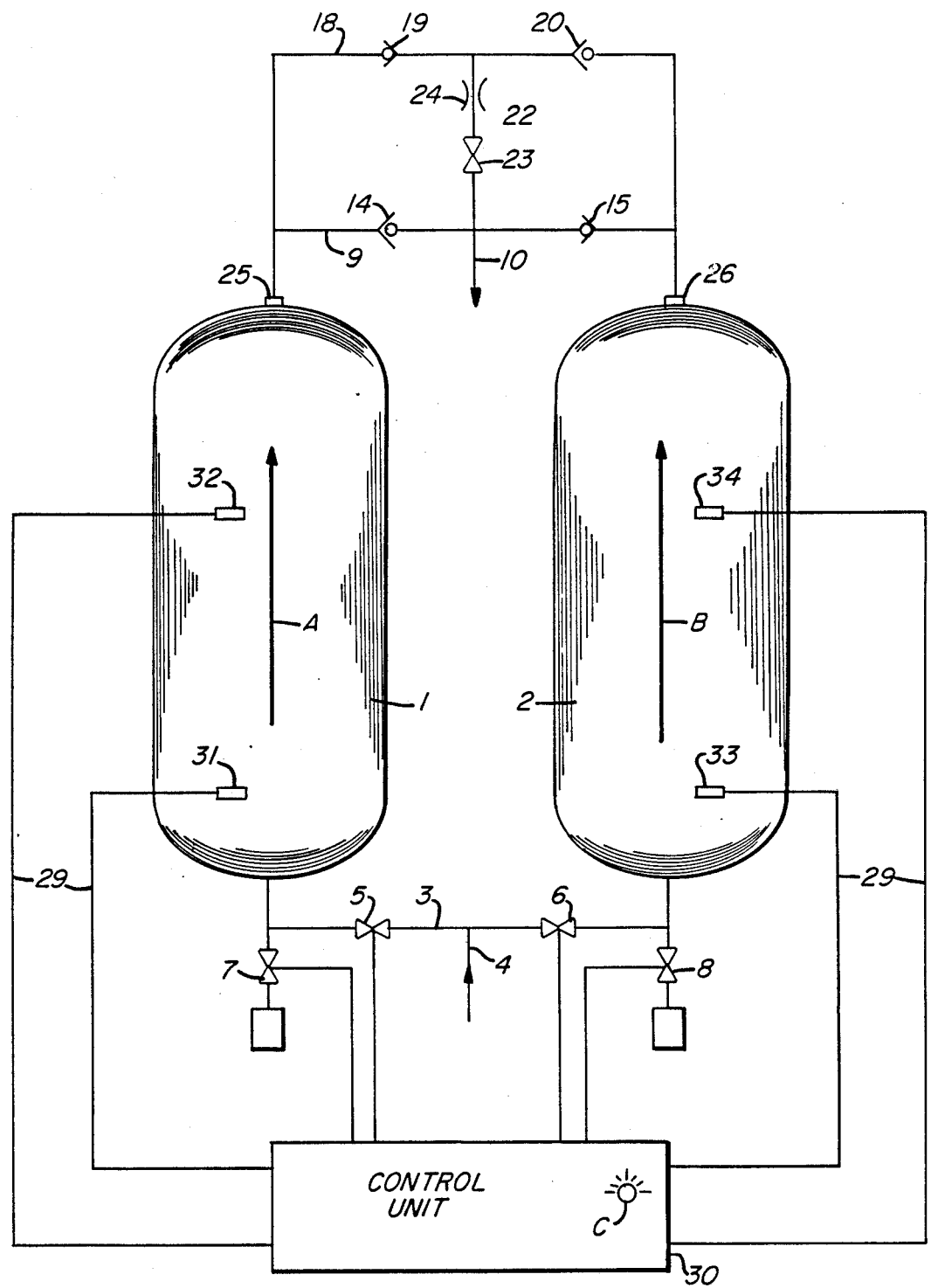

GAS DRYING OR FRACTIONING APPARATUS AND METHOD

BACKGROUND OF THE INVENTION

Dual tower regenerative desiccant dryers are conventionally used to separate a gas fraction from a gas mixture. For example, such dryers are commonly used to remove moisture from compressed air to provide dry compressed air at dew points below the freezing point of water or to reduce the moisture content of compressed air for use in critical process applications. With known dryers, dew points as low as −150° F. can be achieved.

Known dryers are able to continuously dry compressed air by using two identical towers, each containing a desiccant bed. While one tower is on-stream and is drying compressed air by passing the air flow through the desiccant bed therein, the other tower is off-stream and its desiccant bed is being regenerated (i.e. reactivated or dryed out). The towers are alternated on and off stream by a suitable control system so that a dry desiccant bed is always in contact with the stream of wet compressed air passing through the dryer, thus resulting in a continuous supply of dry compressed air downstream from the dryer.

Known regenerative desiccant dryers employ a variety of methods for desiccant regeneration. In heatless or pressure swing dryers, the desiccant is regenerated by expanding a small portion of the dry air product from the on-stream tower to near atmospheric pressure and passing the expanded air through the moisture laden desiccant bed in the tower being regenerated. The heat of adsorption stored in the moisture laden desiccant bed is utilized, in conjunction with the expanded air portion, to extract (or desorb) moisture from the desiccant bed. By contrast, heated dryers require external energy sources to provide the heat of desorption and a carrier gas to remove the desorbed water from the system. The present invention concerns a heatless or pressure swing type of regenerative desiccant dryer.

Such pressure swing desiccant dryers have been known for many years. For example, U.S. Pat. No. 2,944,627 discloses one such pressure swing dryer. Because such apparatus is so well known, it is believed that inclusion of detailed description of such known dryers herein is unnecessary for an understanding of the present invention. The reader is referred to the above cited U.S. Pat. No. 2,944,627, or any other of the several prior patents cited hereinbelow, for a full description of prior dual tower pressure swing type regenerative desiccant dryers.

As noted above the desiccant beds in the drying towers of such a dryer are regenerated by exposure thereof to an expanded portion of the compressed air product. For example approximately 15% (at 100 psig) of the dried compressed air product may be expanded to near atmospheric pressure and then passed as a purge air stream through the tower to be regenerated. Due to this "swing" in pressure of the dried compressed air, the expanded air becomes extremely dry, and passage of the dry purge air through a tower causes moisture to desorb from the desiccant, whereupon the desorbed moisture is carried by the purge air stream out of the dryer. To alternately purge moisture from one and then the other of the dual towers of such a dryer apparatus, well known piping and valving networks are employed, also as disclosed in the above cited U.S. Pat. No. 2,944,627 and other prior patents cited hereinbelow.

In general, pressure swing dryers which operate on a fixed timing cycle with a fixed purge flow rate can perform very well. If the throughput flow of compressed air remains constant at maximum design flow, there generally is no incentive or need to modify the operating cycle of such dryers. In many industrial environments, however, compressed air demand and environmental conditions do not remain constant but vary over time. With such variations, the condition of compressed air entering the dryer can vary widely, exhibiting variations in flow rate, pressure, temperature and dew point. Furthermore, the energy consumption of such dryers can be significant indeed, especially for larger capacity dryers. Efficient control of dryer operation can effectively minimize dryer operating costs.

More specifically, significant economies may be realized if a drying system can be monitered and the regeneration cycled adjusted to reduce purge requirements. For example, a dryer with a 1000 SCFM (standard cubic feet per minute) inlet flow capacity would require approximately 150 SCFM of purge air (15% of inlet flow). To supply this purge air at a cost of, for example, 20¢ per 1000 standard cubic feet for one year of continuous operation, the total cost would be $15,768.00. If the annual compressed air demand were less than system capacity (e.g. demand only 50% of capacity) a corresponding reduction in regeneration requirements is also realized and consequently half the cost of purge air for regeneration ($7,884.00) could be saved by use of a demand control system which effectively regulates the use of purge air.

There are known in the prior art a variety of demand control systems for pressure swing type desiccant dryers. For example, U.S. Pat. No. 3,448,561 discloses a system for controlling the frequency of regeneration for either a heatless or heated desiccant dryer by use of a hygrometer system which samples air from the drying desiccant bed and measures its moisture content. When the moisture content is reduced to a predetermined value, the regenerated tower is placed on line as the other tower is switched to the regeneration mode.

U.S. Pat. No. 4,247,311 discloses a pressure swing dryer system wherein a microprocesser is used in conjunction with transducers which sense moisture to moniter the advance of the moisture front through the drying towers. This information is used to initiate the switching of the towers between the drying and regeneration modes. According to this patent, the system operates on a fixed cycle with the signal from the moisture sensing transducer being utilized to control the frequency of regeneration cycles (i.e. for 50% demand, a drying tower would be regenerated during alternate cycles, while remaining pressurized in a standby mode during the intervening cycles). Other known demand control systems include the following. Deltech Engineering, Inc. has introduced a demand control system for a pressure swing dryer which operates on a fixed ten minute cycle and takes measurements of inlet temperature, inlet pressure, and outlet mass flow rate for input into a microprocessor which then calculates and controls purge flow rate and purge time for the regeneration cycles.

Zurn Industries, Inc. offers a demand control system for pressure swing dryers which utilizes moisture sensors located near the wet air inlet in the desiccant beds. The sensors transmit information on inlet air moisture content to a microprocessor which determines and controls the duration of the regeneration cycle.

A technical manual entitled "A Heaterless Dryer Design Manual" by Ed Peacock suggests a demand control system based on monitoring the temperature rise across the desiccant bed by the use of temperature probes in the inlet and outlet air streams.

The prior art of demand control systems for pressure swing desiccant dryers generally has required incorporation of expensive, sensitive control components which must be continually maintained and recalibrated to provide consistent drying tower switchover. For example, the above described demand control system based on temperature rise across the desiccant bed requires, as noted, temperature transducers in the inlet and outlet piping or near the inlet and outlet ends of the drying towers. Since such a system depends on accurate sensing of inlet and outlet temperatures, small deviations of either the inlet or outlet temperature transducer from proper calibration values can result in delayed or premature tower switchover between the drying and regeneration cycles. In addition, in such a system small variations in inlet air temperature may provoke undesired variation in the regeneration cycle.

BRIEF SUMMARY OF THE INVENTION

The present invention concerns a demand control system for a pressure swing type dryer in which, with a fixed purge flow rate and fixed purge time per cycle, the time duration of the drying cycle is varied to fully utilize the sensible energy storage capacity of the desiccant beds. This control function is achieved by monitoring the temperatures at specified locations in the compressed air flow path through the dryer, preferably within the desiccant beds and/or the purge exhaust.

Briefly, the control scheme of my invention involves measuring and recording the temperature in the purge outlet piping or in an adjacent portion of the tower at the beginning of a regeneration or purge cycle of fixed duration, and comparing this temperature value with the temperature at the same location at the end of the purge cycle. This temperature difference bears a predeterminable proportionate relationship to the temperature differential which develops in a zone of the tower upstream (with respect to the direction of purge flow) from this first mentioned location between the initiation of a drying cycle in the same tower, and a point in time after initiation of the drying cycle.

When the difference between the initial and final temperatures sensed near the purge outlet or in the purge piping during a purge cycle, multiplied by a predeterminable proportionality constant, is exceeded by the temperature increase recorded at the predetermined upstream location during the subsequent drying cycle, the system is actuated to perform a conventional switchover thereby terminating the drying cycle for that tower and beginning another regeneration cycle. At the same time, the alternate tower (which has previously completed its regeneration cycle and has been repressurized) goes on-stream to begin a further gas drying cycle.

It is important to note that according to this invention, each regeneration cycle is of fixed duration, whereas each drying cycle, other than the very first drying cycle, is of a variable duration at least as great as the time duration of the fixed time regeneration cycle plus subsequent repressurization. After regeneration and repressurization of a tower, that tower remains at the ready to begin a further drying cycle when the temperature difference proportionality function that applies is satisfied and switchover occurs.

It is to be further noted that the invention relies on temperature data only as an indicia of energy transfer. Temperature indications do not inherently reveal anything about the process by which a body arrives at a given temperature, but in the operating process of desiccant dryers, reliance on temperature readings is a useful approach to demand control as temperature changes can be regarded generally as bearing a proportional relationship to thermal energy storage in the desiccant beds. Thus it will be appreciated that the temperature indications as utilized for purposes of my invention are indicia of a component of thermal energy value, that being the sensible energy component as distinguished from latent thermal energy.

My invention contemplates both method and apparatus for achieving a novel dryer cycling demand control function, in accordance with the following description. Accordingly, it is one object of the invention to provide a novel and improved method for controlling switchover of the drying towers of a pressure swing air dryer between the adsorbing and desorbing or regenerative cycle portions.

It is another object of the invention to provide a new and improved method for controlling the switching of pressure swing air dryer towers between drying and regeneration cycle portions which utilizes only the monitoring of specified drying tower energy levels by monitoring of temperature for control of tower switchover.

It is a more specific object of this invention to provide a new and improved method for controlling the switchover of pressure swing air dryer towers between adsorbent and regenerative modes in which the timing of such switchovers is variable in response to a selected variable reference generated during a prior regenerative cycle.

It is a further object of this invention to provide a new and improved method for controlling switchover of pressure swing air dryer towers between drying and regenerative modes in which parameters indicative of energy transfer in each tower during successive regenerative cycles are utilized to control the timing of each switchover.

It is a still further object of the invention to provide new and improved control apparatus as well as such an apparatus in combination with a pressure swing air dryer to operate according to the above and other objects.

The above and other objects of the invention will be more readily understood upon consideration of the following detailed description, and the accompanying drawing which illustrates one presently preferred embodiment, and in which the sole figure is a schematic illustration of a dual tower pressure swing air dryer which includes my novel demand control system and which operates in accordance with my novel method of operation.

As is well known, a pressure swing compressed air dryer comprises a pair of towers 1 and 2, each of which has a quantity of suitable desiccant material (not shown) contained therein. Towers 1 and 2 are arranged with respect to suitable piping to provide for operating each tower 1 and 2 through alternate adsorption and regeneration modes, cycles or periods. A regeneration cycle also may be commonly referred to as a desorption cycle or a purge cycle. As shown, the lower ends of towers 1 and 2 are connected via a conduit 3 to a compressed air inlet 4. Conduit 3 has a valve 5 therein for controlling compressed air flow to tower 1 and a valve 6 for controlling compressed air flow to tower 2. A purge/repressurizing valve 7 is connected to conduit 3 between tower 1 and valve 5, and a similar purge/repressurizing valve 8 is connected to conduit 3 between tower 2 and valve 6.

The upper ends of towers 1 and 2 are connected via connections 25 and 26 and a conduit 9 to a central outlet 10. Suitable one-way check valves 14 and 15 are disposed, in opposed relationship, in conduit 9 between outlet 10 and the upper end connections 25, 26, respectively, to control the flow of pressurized air from the towers 1 and 2 to outlet 10. A conduit 18 is connected in parallel with conduit 9 and has its opposed ends in open communication with conduit 9 intermediate check valves 14, 15 and the respective tower connections 25, 26. Conduit 18 has oneway check valves 19 and 20 arranged in opposed relationship and in open communication with the upper ends of towers 1 and 2, respectively, via the connections 25 and 26.

The intermediate portions of conduit 18 (between valves 19 and 20) and conduit 9 (between valves 14 and 15) are connected by a conduit 22. A suitable purge rate control valve 23 is connected in-line with conduit 22 and in series with a purge orifice 24 such that the discharge or low pressure side of orifice 24 is in open communication with conduit 18 between check valves 19 and 20. The above described structure is well known in the art as are controls for actuating valves 5, 6, 7, 8 and 23 as hereinafter described. Accordingly, further description of such known structure and controls is believed to be unnecessary to one of ordinary skill in the art for an understanding of this invention.

As is further known, with valves 6 and 7 closed and valves 5 and 8 open at the beginning of a drying cycle, incoming compressed air (i.e., the moisture bearing main airflow) will enter the dryer via inlet 4 and conduit 3 to flow through valve 5 into tower 1 which is also pressurized. The pressurized air stream flows upwardly through tower 1 as indicated by arrow A to be dried therein and is then discharged from the upper end of the tower into conduits 9 and 18, thereby closing check valve 19 and opening check valve 14. A selected portion of the compressed air flow from tower 1 (e.g. 15%) flows via conduit 22 through valve 23 and orifice 24, whereby it is throttled to near atmospheric pressure to produce a stream of lower pressure, extremely dry air flowing into conduit 18 from conduit 22. Since this low pressure air flow cannot overcome the air pressure from tower 1 which biases valve 19 closed, the low pressure air instead opens valve 20 and flows therethrough to tower 2. Thus, a reduced rate flow of low pressure dry air passes into and downwardly through tower 2 as a purge air flow, indicated by arrow B, to dry and regenerate the desiccant contained therein. The flow of purge air through tower 2 is then discharged via valve 8 to the atmosphere.

In keeping with a prior method of operation of a known pressure swing dryer, a timer-actuated control has been provided to close valve 8 after a predetermined period of regeneration thus allowing the tower 2 to be slowly repressurized. Once tower 2 is repressurized, the time-actuated control would cause valves 6 and 7 to open and valve 5 to close whereby the towers 1 and 2 are switched over. That is, tower 1 enters the regenerative phase or portion of the operating cycle and tower 2 enters the air drying phase or portion of the operating cycle. All of the above structure and method of operation is well known and is set forth in the above identified prior art. Repetition here in detail is not believed necessary for one of ordinary skill in the relevant art to understand the invention.

According to one preferred embodiment of the instant invention, instead of timers or other known expedients to control dryer cycling, pairs of thermal sensors 31, 32 and 33, 34 are installed in the respective towers 1 and 2 with their signal output lines 29 connected to a suitable control unit 30 to control the switchover of the towers from the drying cycle to the regenerative cycle. As shown, tower 2 is provided with thermal sensor 33 in the lower end of the desiccant bed whereby the sensible heat of the desiccant within tower 2 may be measured by sensor 33. It is equally effective for purposes of this invention to measure the temperature of purge gas flow by placing sensor 33 near the purge gas outlet or in the purge gas outlet piping. Sensor 31 is located in a corresponding position in tower 1.

In accordance with the principles of this invention, sensor 33 detects the temperature of the desiccant bed at the beginning of the regeneration cycle, for example in tower 2, and the resulting output signal ($T_{33i}$) is transmitted to control unit 30 via the respective line 29 and is suitably stored as in an electronic memory bank included in conjunction with a processor in control unit 30.

After a fixed interval of time from the beginning of the purge cycle for tower 2 (e.g. 4 minutes), sensor 33 again detects the temperature of the desiccant bed and the resulting output signal ($T_{33f}$) is transmitted to control unit 30 via the respective line 29 and the stored temperature data is processed by subtracting signal $T_{33f}$ from the signal $T_{33i}$. The temperature of the purge air as measured by sensor 33 will always decrease as a purge cycle progresses such that the magnitude of signal $T_{33i}$ will always exceed the magnitude of signal $T_{33f}$. The difference in magnitude of signals $T_{33i}$ and $T_{33f}$ is stored for later use to determine when to terminate the subsequent compressed air drying cycle of tower 2. For inlet air dew points below about 40° F., the magnitude of these temperature differences may be too small to precisely detect. Additionally, in instances where the ambient temperature and compressed air inlet temperature differ by 15° F. or more, the desiccant vessels preferably should be jacketed with thermal insulation.

Another thermal sensor 34 is provided to measure the temperature of the desiccant in tower 2 at a location above the location of sensor 33 or upstream therefrom with respect to the direction of purge air flow, for example, about 2/5 of the desiccant bed length from the top of tower 2. Sensor 32 is located in a corresponding position in tower 1. Sensor 34 is utilized to measure the temperature of the desiccant bed at the indicated location in tower 2. Thus, at the beginning of a compressed air drying cycle in tower 2 the magnitude of desiccant temperature ($T_{34i}$), as measured by sensor 34, is stored in the processor in control unit 30. After a selected time interval in the drying cycle, preferably at least as great as the fixed duration of the regenerative cycle plus ensuing repressurization for the alternate tower, the temperature of the desiccant bed in tower 2, at the location of sensor 34, is monitored continuously or at intervals to provide temperature readings $T_{34}$ for use in a manner described hereinbelow to control tower switchover.

From the above, it will be appreciated that the drop in temperature of the gas flow in either tower during a regenerative or purge cycle establishes a base or reference parameter from the temperature magnitude ($T_{33i}$-$T_{33f}$). This reference parameter may be modified by a constant, K, that can be greater than or less than 1. The constant K is preferably an electrical signal selected with reference to a selected dew point to which the processed air is to be dried by passage thereof through the tower during a compressed air drying cycle. For selective variation of K, the control unit 30 is provided with a selectively manually operable control, shown schematically at C, and of any suitable structure to vary the magnitude of the reference parameter by variation of the constant K. According to the presently preferred best mode of the invention, lower dew points (i.e. drier air) require smaller values of K, for example 0.1 to 0.5, and the higher dew points require the larger values of constant K, for example 2.0 to 4.0. Thus, the value of K can vary generally in a range between, for example, 0.1 and 4.0, and may be selectively varied by an operator as desired in accordance with the specific requirements of dryer operation.

The indicated K values are generally applicable for temperature sensors positioned as above described in the gas flow paths through the dryer towers. Alternative relative positioning for the temperature sensors is contemplated and for such alternatives the range of K values will differ. For any given temperature sensor positions, the K values can be derived from the principles of thermodynamics, the given inlet air conditions and the desired dryer system outlet air conditions.

As has been noted, the present invention contemplates control of pressure swing dryer cycling by detecting the temperature drop which occurs during a predetermined time interval in a regenerative cycle, at a location in or near the purge outlet, and generating a parameter which is proportional to this temperature drop for comparison with the temperature difference which occurs at a relatively higher elevation within the tower during the subsequent drying cycle. When the temperature difference at such higher elevation exceeds the generated parameter, the control unit is triggered to switchover the dryer system so that the dual towers switch roles: The tower which had been drying air switches to regeneration and the tower which has been regenerated and is standing at the ready switches to compressed air drying, both through operation of the conventional valves and piping as hereinabove described.

The temperature relationship on which this invention relies may be stated more succinctly as the following mathematical condition, which is stated with reference to tower 2, it being understood that the same condition applies to tower 1 as in operation the towers operate in repetitive alternating cycles, generally 180 degrees out of phase with one another, by repeatedly reversing roles between air drying and regeneration. Tower 2 switchover from drying to regeneration occurs when the following condition is satisfied:

$$T_{34} - T_{34i} > K (T_{33i} - T_{33f})$$

Where:

$T_{34}$ is current temperature or a proportional signal from temperature sensor 34.

$T_{34i}$ is the temperature or proportional signal from sensor 34 at the initiation of a drying cycle;

$T_{33i}$ is the temperature or proportional signal from sensor 33 at the initiation of the most recent prior regeneration cycle in the same tower;

$T_{33f}$ is the temperature or proportional signal from sensor 33 at the end of the most recent prior regeneration cycle for the same tower; and K is a proportionality constant whose value is a function of the position of the temperature transducers within the tower and the desired product dew point.

Similarly, tower 1 switchover from drying to regeneration occurs when:

$$T_{32} - T_{32i} > K (T_{31i} - T_{31f}).$$

It will be further appreciated that in the described desiccant dryer operating environment, the specified temperature relationships correspond to energy relationships. Thus, my novel control system relies on temperature parameters as indicators of energy values.

Operation of the above-described novel demand control system on a continuous basis consists of repetitive cycles of alternate drying and regeneration for each tower in keeping with the above description, and differs from the above description of a single cycle switchover only for the initial cycle, the operation thereafter comprising the coordinated switching of towers 1 and 2 between the drying and regeneration modes as follows: At initial start up, one tower is drying air, Tower 1 for example, while tower 2 is being regenerated. Thus, valves 7 and 6 are closed and valves 8 and 5 are open. Moisture bearing compressed air thus flows via conduits 4 and 3 into tower 1 for drying thereof, and a portion of the dried air flow leaving tower 1 (e.g. 15%) is throttled by orifice 24 to near atmospheric pressure and directed to tower 2 for regeneration thereof as above described, the purge air thence passing via valve 8 to the atmosphere. At the beginning of the first regeneration cycle for tower 2, temperature sensor 33 detects the temperature at its location within tower 2, the resulting signal being stored in the memory of control unit 30 for subsequent use. The signal generated by the temperature detected by sensor 33 after a fixed interval of purge time (e.g., 4 minutes) is subtracted from the value initially obtained and the difference is stored for subsequent use to determine when to terminate the ensuing tower 2 drying cycle. At the end of the fixed duration purge cycle, valve 8 is closed, purge exhaust flow is terminated, and tower 2 is repressurized to line pressure to await the beginning of its first drying cycle.

For the initial drying cycle of tower 1, switchover will occur after a predetermined fixed time. That is, for the first cycle only, tower 1 dries air for a predetermined fixed time longer than the duration of the fixed purge cycle because there is no prior tower 1 regeneration cycle from which controlling parameters can be adduced in accordance with the above-stated relationship. Subsequent switchovers are controlled by the monitoring and comparing of signals generated by detection of system temperatures as above described. For the first cycle however, at the end of a drying cycle of predetermined duration in tower 1, the towers are switched by closing valve 5 and opening valves 6 and 7 such that full compressed air flow begins passing upwardly through tower 2 and a portion of the dried product exiting tower 2 is throttled to near atmospheric pressure via orifice 24 and passed downwardly through tower 1 for regeneration of tower 1. At the beginning of this tower 2 drying cycle, upon the initial switchover, the temperatures or proportional signals detected by sensors 31 and 34 are stored in the memory of control unit 30. After tower 1 has been regenerated for the fixed interval of purge time (e.g. 4 minutes), the signal then detected by sensor 31 is subtracted from the value detected by sensor 31 at the beginning of the tower 1 regeneration cycle. This difference is stored in the memory of control unit 30, just as during the above-described first regenerative cycle for tower 2, for subsequent generation of a reference parameter which will be compared with a temperature sensor signal differential which develops during the subsequent tower 1 drying cycle to control termination of the drying cycle by another switchover operation. Coincidentally, the tower 1 regeneration cycle is terminated by closing of valve 7 and tower 1 is repressurized to await switchover of gas drying operations from tower 2.

After additional time sufficient to allow tower 1 to fully repressurize (e.g. 1 minute additional) monitoring of the signal from the sensor 34 is begun and the above-stated mathematical condition comes into play through operation of the microprocessor in control unit 30. When the condition is satisfied, switchover occurs once again so that tower 2 once again begins a regeneration cycle and tower 1 once again begins a drying cycle. This sequence of cycling switchovers between towers 1 and 2 is repeated indefinitely so long as the dryer remains in operation, with the towers reversing roles in the usual fashion. It is noted here for emphasis that the dryer per se, the piping and valving, and the mode of operation in drying compressed air and regenerating the desiccant, are all known from the prior art. This invention pertains specifically to a novel and improved structure and method for controlling the cycling of such a dryer, and a novel dryer system including, in combination, a dryer apparatus and cycling control system.

The effect of this control system is to extend drying cycle time inversely with demand on the dryer. For example, with this control system a pressure swing dryer that is designed to operate on a 10 minute full cycle at full load will operate on a 20 minute cycle at ½ load and a 30 minute cycle at ⅓ load. The invention also contemplates provisions to limit the maximum cycle time since at extremely slow flow rates the heat of adsorption can be dissipated to the ambient atmosphere as quickly as it is generated. That is, the rate of heat loss to the ambient air would equal the rate at which heat is generated due to adsorption on the desiccant, and under such conditions the heat of adsorption is not available to provide the heat necessary for subsequent desiccant regeneration.

According to this invention, selection of the constant of proportionality K, given the operational characteristics of a particular dryer and the location of the temperature sensors in the towers, depends upon the desired dew point of the dried air product output. For example, with one preferred dryer arrangement, the constant of proportionality K will give output air dew points as follows:

| K | Output Air Dewpoint |
| --- | --- |
| 0.1 | −80 degrees |
| 0.5 | −40 degrees |
| 1.0 | −0 degrees |
| 2.0 | +40 degrees |

In summary, this invention contemplates control of pressure swing dryer cycling requirements in response to demand for dried compressed gas product. The temperature sensors monitor the location and magnitude of temperature fronts in the desiccant beds as indicative of energy values, and use the temperature signal information to adjust the length of the gas drying cycles with a view to minimizing heat of adsorption losses to the outlet gas stream. Prior known demand control systems rely on measurements of the quantity of moisture removed by desiccant in a tower, and the amount of purge required to remove this water from the desiccant during regeneration. In other words, they rely on the position of the mass transfer front in the desiccant bed. Although water removal is of primary importance with regard to the ultimate purpose of a dryer (i.e., drying the gas), it is only of secondary importance with regard to efficient operation of the dryer. Optimal operation can be achieved only if the capacity of the desiccant for storing sensible energy is properly utilized.

As my invention utilizes only temperature sensors to activate the demand control system, it is inherently more reliable, more stable and less expensive than many other demand control systems. For example, other systems are known to utilize sensors for measuring moisture content of the air or desiccant, air flow rate, or pressure. Further, my novel demand control system does not rely on measurement of absolute values of temperature since control is based on changes in temperature from one point in time to another at a single location. Since a single sensor makes both of the temperature readings on which the controlling values on opposite sides of the critical mathematical condition are based, there is never occasion to compare the absolute temperature readings between two different probes in generating these controlling values. Accordingly, the accuracy of calibration between different temperature transducers is of no concern. Calibration error generally will have no impact on the temperature differential values utilized for this control system.

An alternative embodiment of my invention utilizes substantially the same control elements as hereinabove specified but employs a fixed duration gas drying cycle and a purge cycle which is regulated by control of the purge time. According to this alternative embodiment, control influences operate in somewhat of an inverse manner from those above specified. A tower is on line in a gas drying cycle for a fixed duration period, five minutes for example, with initial and terminal measurements of temperature being made as above specified. That is, during the drying cycle an initial and terminal temperature reading is taken by the further downstream of the two temperature sensors in the tower. The magnitude of the difference between these initial and terminal temperature readings again is multiplied by an empirically determined constant and the result compared to the purge temperature drop which occurs at the downstream one of the two temperature sensors in the tower, reckoned with respect to purge flow. When the purge flow temperature drop at this location exceeds the value of the base parameter that was computed from drying cycle conditions, the purge cycle is terminated.

This alternative embodiment of my invention would be most suitable in attempts to attain extremely low dew points (e.g. −100° F.). However, to attain such low dew points or other desirable ends while minimizing use of purge air, other limitations such as limits on total cycle times may be necessary. For example, to achieve −100° F. dew points, it would be necessary to limit purge cycle times to approximately four minutes, or two minutes per tower in a dual tower dryer.

It will be seen from the above description that I have invented a novel and improved method and apparatus for drying compressed air, or more generally for removing a gas fraction from a gas mixture. Of course, I have contemplated various alternative and modified embodiments of my invention, and such would certainly also occur to those versed in the art, once apprised of my invention. Accordingly, it is my intent that the invention not be limited by the above description, but that it be construed as broadly as permitted by the scope of the claims appended hereto.

I claim:

1. In an apparatus for extracting a gas from a gas mixture wherein a flow control means is selectively operable to pass a stream of such a gas mixture in a given flow direction through a gas flow path which includes a desiccant mass in a repetitive sequence of gas drying cycles to adsorb such a gas from such a gas mixture during each such gas drying cycle, and the flow control means being further operable between sequential ones of such gas drying cycles to direct a stream of gaseous medium in a reverse flow direction opposite said given flow direction through the desiccant mass to regenerate the desiccant mass by removing therefrom at least a portion of the product formed upon adsorption of such a gas by such a desiccant mass to thereby permit the desiccant mass to be effective for further gas adsorption in a subsequent gas drying cycle, a control system for limiting the duration of such a subsequent gas drying cycle comprising:
   a first detector means adapted to be positioned at a selected location in such a gas flow path;
   a second detector means adapted to be positioned in such a gas flow path upstream, with respect to said given flow direction, from said first detector means;
   said first and second detector means being operable to generate control signals in response to temperatures detected thereby in such a flow path;
   a control means operable to process control signals generated by said first and second detector means, and means for providing operative communication between said first and second detector means, respectively, and said control means;
   said control means including processor means which is operable to compute a first control parameter that is proportional to the difference between the control signal generated by said second detector means at initiation and at termination of such a regeneration cycle, and to repeatedly compute a second control parameter comprised of the difference between the control signal generated by said first detector means at initiation of such a subsequent gas drying cycle and the control signal generated thereby at intervals during said subsequent gas drying cycle;
   said processor means being further operable to repeatedly compare said first and second control parameters;
   said control means being further operable to actuate such flow control means to terminate said subsequent gas drying cycle when the magnitude of said second control parameter exceeds the magnitude of said first control parameter.

2. The control system as claimed in claim 1 wherein said first and second detector means include first and second temperature detectors, respectively.

3. The control system as claimed in claim 2 wherein said first and second temperature detectors comprise a first pair of detectors and said control system further includes a second pair of corresponding temperature detectors located with respect to another gas flow path in positions corresponding to the positions of the said first pair of temperature detectors in the first mentioned gas flow path.

4. The control system as claimed in claim 3 wherein said control means is further operable to actuate such a flow control means, upon termination of such a subsequent gas drying cycle in one of the gas flow paths, to intiate a regeneration cycle in the same gas flow path and to initiate another gas drying cycle in the other of the gas flow paths.

5. The control system as claimed in claim 2 wherein at least said first temperature detector is located within said desiccant mass.

6. The control system as claimed in claim 5 wherein said first and second temperature detectors are located within said desiccant mass.

7. In a process which is operable to extract a gas from a gas mixture by passing a stream of such a gas mixture in a given flow direction through a flow path which includes a desiccant mass to adsorb such a gas from such a gas mixture to produce an output gas stream of given conditions, and which is further operable to periodically direct a stream of gaseous medium in a reverse flow direction opposite said given flow direction through the desiccant mass to regenerate the desiccant mass by desorbing therefrom at least a portion of the product formed upon adsorption of such a gas from such a gas mixture whereby a sequence of alternating adsorbing and desorbing cycles may be performed, a method for limiting the time duration of a gas adsorbing cycle following a gas desorbing cycle comprising the steps of:
   generating a first signal which corresponds to the value of a component of thermal energy at a first selected location within the gas flow path upon initiation of a gas desorbing cycle;
   generating a second signal which corresponds to the value of said component of thermal energy at said first selected location upon termination of said gas desorbing cycle;
   generating a first control parameter which is proportional to the magnitude of the difference between said first and second signals;
   initiating a gas adsorbing cycle by directing a continuous flow of the gas mixture through the gas flow path in said given flow direction;
   coincidentally with said initiating step, generating a third signal which corresponds to the value of a component of thermal energy at a second selected location within the flow path downstream, with respect to said given flow direction, from said first selected location;
   monitoring said component of thermal energy at said second selected location during said gas absorbing and computing a second control parameter as the difference between said third signal and a fourth signal which corresponds to the value of said component of thermal energy monitored at said second selected location;

comparing said first and second control parameters;

repeating said monitoring, computing and comparing steps in sequence until the magnitude of said second control parameter exceeds the magnitude of said first control parameter; and terminating said gas adsorbing cycle when the magnitude of said second control parameter exceeds the magnitude of said first control perimeter.

8. The method as claimed in claim 7 wherein said generating said first control parameter includes forming the mathematical product of said magnitude of difference between said first and second signals and a constant of proportionality which is determined with reference to specified positions of said first and second selected locations and specified values of said output gas stream given conditions.

9. The method as claimed in claim 8 wherein said given conditions include the dewpoint of said output gas stream.

10. The method as claimed in claim 9 wherein said first, second and third signals are signals proportional to the temperatures detected at said first and second selected locations.

11. An apparatus for extracting a gas component from a gas mixture comprising:

a flow path means adapted to have a stream of such a gas mixture and a stream of gaseous purge medium passed alternately therethrough;

desiccant means disposed within said flow path means;

said desiccant means being effective, when such a gas mixture is passed therethrough in a gas adsorption cycle, to adsorb such a gas component from such a gas mixture and being further effective, when such a gaseous purge medium is passed therethrough in a gas desorbing cycle, to desorb such a gas component;

flow control means operable to control the passage of such a gas mixture and passage of such a stream of gaseous purge medium through said flow path;

first detector means positioned at a first selected location within said gas flow path;

second detector means positioned at a second selected location upstream, with respect to the direction of flow of such a gas mixture within said flow path means during gas adsorption, from said first detector means;

said first and second detector means being operable to generate control signals in response to temperatures detected thereby in such a flow path;

a control means operable to process control signals generated by said first and second detector means and means for providing operative communication between said first and second detector means, respectively, and said control means;

said control means being cooperable with said flow control means to terminate passing of such a stream of a gas mixture through said flow path upon satisfaction of a given relationship between said control signals generated by said first and second detector means;

said control means being operable to compute a first control parameter that is proportional to the difference between the control signals generated by said second detector means at initiation and termination of such a gas desorbing cycle and being further operable to compute a second control parameter which is the difference between the control signal generated by said first detector means at initiation of such a gas adsorbing cycle and the control signal generated thereby at a subsequent time during such gas adsorbing cycle; and said control means being further operable to compare said first and second control parameters and to actuate said flow control means to terminate such gas adsorbing cycle when the magnitude of said second control parameter exceeds the magnitude of said first control parameter.

12. The apparatus as claimed in claim 11 wherein said first and second detector means are temperature detectors.

13. The apparatus as claimed in claim 12 wherein said first selected location is a location within said desiccant means.

14. The apparatus as claimed in claim 13 wherein said flow path means includes a tower means and said desiccant means includes a bed of desiccant material contained within said tower means.

15. The apparatus as claimed in claim 14 wherein said tower means includes a pair of dryer towers, each containing a bed of said desiccant material.

16. The apparatus as claimed in claim 15 wherein said dryer towers each form a portion of a respective gas flow path, the said gas flow paths being interconnected by means including said flow control means and operable to alternate said pair of towers continuously between operation in such gas adsorbing and gas desorbing cycles.

17. In an apparatus for extracting a gas from a gas mixture wherein a flow control means is selectively operable to pass a stream of such a gas mixture in a given flow direction through a gas flow path which includes a desiccant mass in a repetitive sequence of gas drying cycles to adsorb such a gas from such a mixture during each such gas drying cycle, and the flow control means being further operable between sequential ones of such gas drying cycles to direct a stream of gaseous medium in a reverse flow direction opposite said given flow direction through the desiccant mass to regenerate the desiccant mass by removing therefrom at least a portion of the product formed upon adsorption of such a gas by such a desiccant mass to thereby permit the desiccant mass to be effective for further gas adsorption in a subsequent gas drying cycle, a control system for limiting the duration of such a subsequent gas drying cycle comprising:

a first detector means adapted to be positioned at a selected location in such a gas flow path;

a second detector means adapted to be positioned in such a gas flow path downstream, with respect to said given flow direction, from said first detector means;

said first and second detector means being operable to generate control signals in response to temperatures detected thereby in such a flow path;

a control means operable to process control signals generated by said first and second detector means, and means for providing operative communication between said first and second detector means, respectively, and said control means;

said control means including processor means which is operable to compute a first control parameter that is proportional to the difference between the control signal generated by said second detector means at initiation and at termination of such a gas drying cycle, and to repeatedly compute a second control parameter comprised of the difference between the control signal generated by said first detector means at initiation of such a subsequent regeneration cycle and the control signal generated thereby at intervals and during said subsequent regeneration cycle;

said processor means being further operable to repeatedly compare said first and second control parameters; and said control means being further operable to actuate such flow control means to terminate said subsequent regeneration cycle when the magnitude of said second control parameter exceeds the magnitude of said first control parameter.

18. In a process which is operable to extract a gas from a gas mixture by passing a stream of such a gas mixture in a given flow direction through a flow path which includes a desiccant mass to adsorb such a gas from such a gas mixture to produce an output gas stream of given conditions, and which is further operable to periodically direct a stream of gaseous medium in a reverse flow direction opposite said given flow direction through the desiccant mass to regenerate the desiccant mass by desorbing therefrom at least a portion of the product formed upon adsorption of such a gas from such a gas mixture whereby a sequence of alternating adsorbing and desorbing cycles may be performed, a method for limiting the time duration of a gas desorbing cycle following a gas adsorbing cycle comprising the steps of:

generating a first signal which corresponds to the value of a component of thermal energy at a first selected location within the gas flow path upon initiation of a gas adsorbing cycle;

generating a second signal which corresponds to the value of said component of thermal energy at said first selected location upon termination of said gas adsorbing cycle;

generating a first control parameter which is proportional to the magnitude of the difference between said first and second signals;

initiating a gas desorbing cycle by directing a continuous flow of the gaseous medium through the gas flow path in said reverse flow direction;

coincidentally with said initiating step, generating a third signal which corresponds to the value of a component of thermal energy at a second selected location within the flow path downstream, with respect to said reverse flow direction, from the first selected location;

monitoring said component of thermal energy at said second selected location during said gas desorbing cycle and computing a second control parameter as the difference between said third signal and a fourth signal which corresponds to the value of said component of thermal energy monitored at said second selected location;

comparing said first and second control parameters;

repeating said monitoring, computing and comparing steps in sequence until the magnitude of said second control parameter exceeds the magnitude of said first control parameter; and terminating said gas desorbing cycle when the magnitude of said second control parameter exceeds the magnitude of said first control perameter.

19. An apparatus for extracting a gas component from a gas mixture comprising:

a flow path means adapted to have a stream of such a gas mixture and a stream of gaseous purge medium passed alternately therethrough;

desiccant means disposed within said flow path means;

said desiccant means being effective, when such a gas mixture is passed therethrough in a gas adsorption cycle, to adsorb such a gas component from such a gas mixture and being further effective, when such a gaseous purge medium is passed therethrough in a gas desorbing cycle, to desorb such a gas component;

flow control means operable to control the passage of such a gas mixture and passage of such a stream of gaseous purge medium through said flow path;

first detector means positioned at a first selected location within said gas flow path;

second detector means positioned at a second selected location downstream, with respect to the direction of flow of such a gas mixture within said flow path means during gas adsorption, from said first detector means;

said first and second detector means being operable to generate control signals in response to temperatures detected thereby in such a flow path;

a control means operable to process control signals generated by said first and second detector means and means for providing operative communication between said first and second detector means, respectively, and said control means;

said control means being cooperable with said flow control means to terminate passing of such a gaseous purge medium through said flow path upon satisfaction of a given relationship between said control signals generated by said first and second detector means;

said control means being operable to compute a first control parameter that is proportional to the difference between the control signals generated by said second detector means at initiation and termination of such a gas adsorbing cycle, and being further operable to compute a second control parameter which is the difference between the control signal generated by said first detector means at initiation of such a gas desorbing cycle, and the control signal generated thereby at a subsequent time during such gas desorbing cycle; and said control means being further operable to compare said first and second control parameters and to actuate said flow control means to terminate such gas desorbing cycle when the magnitude of said second control parameter exceeds the magnitude of said first control parameter.

20. In a pressure swing regenerative desiccant dryer having a desiccant bed which is used in a sequence of gas drying cycles alternating with a sequence of desiccant purge cycles in sustained operation, the method of varying the time duration of a cycle in one of said sequences comprising the steps of:

first determining a first temperature parameter as the change in temperature from the beginning to the end of a given cycle of the other of said sequences in a gas flow discharge region of the desiccant bed;

monitoring a second temperature parameter as the change in temperature in a gas flow inlet region of the desiccant bed during the respective cycle of said one sequence first succeeding said given cycle;

second determining the ratio of said first and second temperature parameters; and terminating said respective cycle when said ratio is a predetermined value.

21. The method as set forth in claim 20 wherein said first determining and said monitoring are by respective first and second temperature sensor means.

22. The method as set forth in claim 21 wherein the time duration of each cycle of said other sequence is maintained constant.

23. The method as set forth in claim 22 wherein said terminating is accomplished by switching the desiccant bed from said respective cycle to begin the succeeding cycle of said other sequence.

24. The method as set forth in claim 23 including the serial repetition of said first determining, monitoring, second determining and terminating steps.

25. The method of varying the time duration of the drying cycle of a pressure swing regenerative desiccant dryer during sustained operation of such a dryer comprising the steps of:

first determining by a first temperature sensor means the magnitude of a first temperature change in the gas flow discharge region of a desiccant bed from the beginning to the end of a given regeneration cycle therein;

monitoring by a second temperature sensor means the magnitude of a second temperature change in a portion of said desiccant bed spaced toward the gas flow inlet region from said first temperature sensor means during the drying cycle immediately following said given regeneration cycle, from the beginning of said drying cycle;

second determining the ratio of said first and second temperature changes; and terminating said gas drying cycle when said ratio reaches a predetermined value.

26. The method as set forth in claim 25 including the serial repetition of said first determining, monitoring, second determining, and terminating steps in a sequence of alternating regeneration and gas drying cycles.

27. The method as set forth in claim 26 wherein the time duration of each said regeneration cycle is constant.

28. The method as set forth in claim 27 wherein said terminating is accomplished by switching said desiccant bed to begin the succeeding regeneration cycle therein.

29. The method of varying the time duration of the regeneration cycle of a pressure swing regenerative desiccant dryer during sustained operation of such a dryer comprising the steps of:

first determining by a first temperature sensor means the magnitude of a first temperature change in the gas flow discharge region of a desiccant bed from the beginning to the end of a given gas drying cycle therein;

monitoring by a second temperature sensor means the magnitude of a second temperature change in a portion of said desiccant bed spaced toward the gas flow inlet region from said first temperature sensor means during the regeneration cycle immediately following said given gas drying cycle, from the beginning of said regeneration cycle;

second determining the ratio of said first and second temperature changes; and terminating said regeneration cycle when said ratio reaches a predetermined value.

30. The method as set forth in claim 29 including the serial repetition of said first determining, monitoring, second determining, and terminating steps in a sequence of alternating gas drying and regeneration cycles.

31. The method as set forth in claim 30 wherein the time duration of each said gas drying cycle in said sequence is constant.

32. The method as set forth in claim 31 wherein said terminating is accomplished by switching said desiccant bed to begin the succeeding gas drying cycle therein.

* * * * *

UNITED STATES PATENT AND TRADEMARK OFFICE
CERTIFICATE OF CORRECTION

PATENT NO. : 4,941,894
DATED : July 17, 1990
INVENTOR(S) : James B. Black

It is certified that error appears in the above—identified patent and that said Letters Patent is hereby corrected as shown below:

In the drawing, the upwardly directed arrow B superimposed on tank 2 is deleted and in substitution thereof a similar arrow directed downwardly is to be inserted.

In column 11, line 33, insert --in a regeneration cycle-- directly after "desiccant mass."

In column 13, line 12, delete "perimeter" and substitute --parameter--.

In column 14, line 46, the words --in a regeneration cycle-- are inserted directly after "desiccant mass."

In column 14, line 51, delete "subsequent gas drying" and substitute --regeneration--.

In column 15, line 7, delete "such a" and substitute --the--. In the same column, line 9, delete "and."

Signed and Sealed this

Third Day of September, 1991

Attest:

HARRY F. MANBECK, JR.

Attesting Officer

Commissioner of Patents and Trademarks